Figure 1:
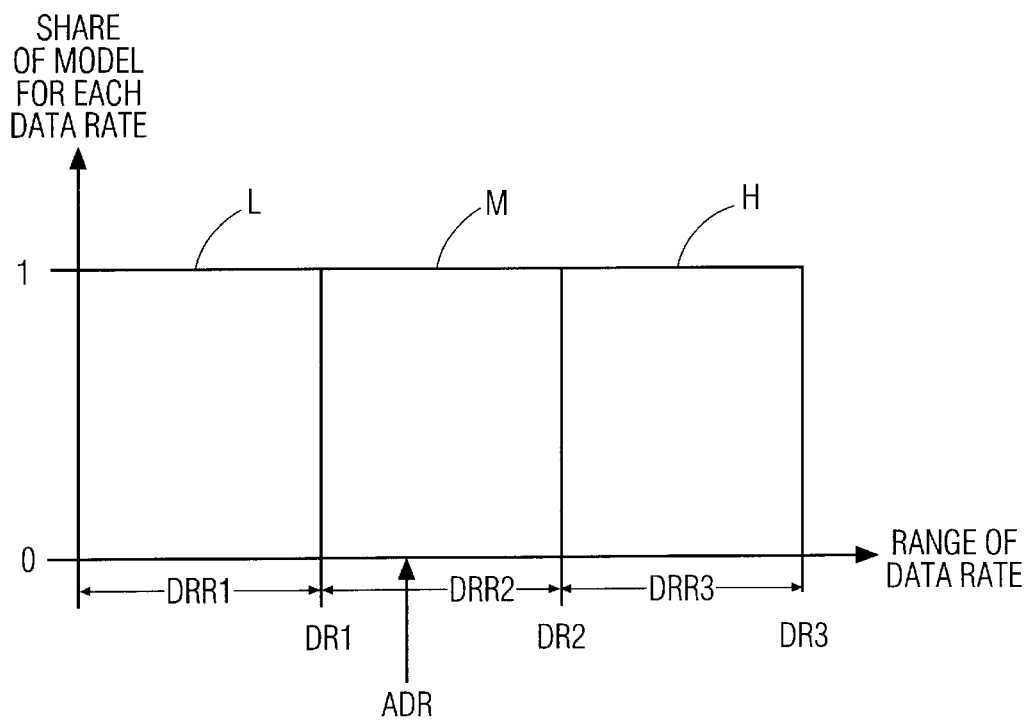

United States Patent
Spille

Patent Number: 6,009,399
Date of Patent: *Dec. 28, 1999

[54] METHOD AND APPARATUS FOR ENCODING DIGITAL SIGNALS EMPLOYING BIT ALLOCATION USING COMBINATIONS OF DIFFERENT THRESHOLD MODELS TO ACHIEVE DESIRED BIT RATES

[75] Inventor: Jens Spille, Hemmingen, Germany

[73] Assignee: Deutsche Thomson-Brandt GmbH, Villingen-Schwenningen, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/838,297

[22] Filed: Apr. 16, 1997

[30] Foreign Application Priority Data

Apr. 26, 1996 [EP] European Pat. Off. .............. 96106678

[51] Int. Cl.$^6$ ....................................................... G10L 7/04
[52] U.S. Cl. ........................... 704/501; 704/229; 704/230
[58] Field of Search ................................... 704/500, 229, 704/230, 501

[56] References Cited

U.S. PATENT DOCUMENTS

| | | | |
|---|---|---|---|
| 4,516,258 | 5/1985 | Ching et al. | 381/31 |
| 4,899,384 | 2/1990 | Crouse et al. | 381/31 |
| 5,608,713 | 3/1997 | Akagiri et al. | 369/124 |

FOREIGN PATENT DOCUMENTS

| | | | |
|---|---|---|---|
| 0655876 | 5/1995 | European Pat. Off. | H04S 1/00 |
| 94/07313 | 3/1994 | WIPO | H04B 14/04 |

OTHER PUBLICATIONS

Stark, Introduction to Numerical Methods, MacMillan 273–278, 1970.
International Standard ISO/IEC 11172–3:1993, p.6 Aug. 1, 1993.
Copy of the Search Report.

*Primary Examiner*—David R. Hudspeth
*Assistant Examiner*—Harold Zintel
*Attorney, Agent, or Firm*—Joseph S. Tripoli; Alexander J. Burke

[57] ABSTRACT

A method for encoding a digitized audio signal which includes the step of selecting one of two or more psycho acoustic model provided for generating masking thresholds used in a data reduction process. The selecting criterion is the available data rate for the encoded bit stream. Each one of the two or more psycho acoustic models is adapted to a specific data rate of the encoded bit stream. In a second embodiment, the method includes the step of combining two or more masking thresholds resulting from different psycho acoustic models, thereby leading to a more accurate calculation of a masking threshold for the data reduction process. Further, there are appropriate apparatuses for the encoding of digitized audio signals.

11 Claims, 4 Drawing Sheets

METHOD AND APPARATUS FOR ENCODING DIGITAL SIGNALS EMPLOYING BIT ALLOCATION USING COMBINATIONS OF DIFFERENT THRESHOLD MODELS TO ACHIEVE DESIRED BIT RATES

The present invention relates to a method and an apparatus for encoding of a digitalized audio signal.

BACKGROUND

The psycho acoustic model in an audio encoder, e.g. in a MPEG 1 or MPEG 2 audio system, calculates a masking threshold for data reduction purposes. The masking threshold may vary for each subband of the audio signal. The so called bit allocation process defines for each subband due to the determined masking threshold, with which resolution the subband samples should be quantized. This will vary in time with each block of audio signal samples. Therefore the necessary bitrate for an optimal sound quality should also vary for the different blocks. In practice in an MPEG1 audio system, the available desired bitrate is normally fixed for each audio channel. Because, with respect to the desired bitrate, the exact number of bits for the various parameters and data required for transmission cannot be estimated exactly in advance some bits are left over or some bits are missing. Usually a simple allocation strategy is used to overcome this problem, e.g. by assigning a nearly equal number of such bits for each subband.

The present allocation strategies mentioned above do not take into account the psycho acoustic model used in the encoder. Nowadays, encoders are optimised for a small range of bitrates. In spite of this fact such audio coders are used also for operation in a larger range of bit rates, but they are not optimised for doing so. The different bitrates may occur between the left and right channel and/or additional channels (left surround, right surround, center) and/or in MPEG LayerIII where the desired bit rate can vary from frame to frame.

SUMMARY OF THE INVENTION

It is an object of the invention to disclose a method of achieving a better audio coding quality with respect to such allocation strategies.

It is a further object of the invention to disclose an apparatus which utilises the inventive method.

In a first embodiment of the invention at least three psycho acoustic models are used instead of one, each of which is optimised for a certain bitrate or range of bitrates. Depending on the desired channel or frame bitrate the encoder selects the appropriate one of the psycho acoustic models. The output of one of the psycho acoustic models can be regarded as a standard masking threshold for a certain desired bitrate.

When the present number of bits is to high, the second psycho acoustic model is used which has in general a higher masking threshold. This higher threshold is not the standard threshold being lifted equally over the spectrum like in the prior art, but lifted in relation to a psycho acoustic model which is still adapted to the present input spectrum.

When the present number of bits is to low, the third psycho acoustic model is used which has in general a lower masking threshold. Again, this lower threshold is not the standard threshold being decreased equally over the spectrum like in the prior art, but decreased in relation to a psycho acoustic model which is still adapted to the present input spectrum.

A second embodiment of the invention solves the problems of the hard switching between the different psycho acoustic models, e.g. between the left and right channel and/or in MPEG LayerI to LayerIII where the desired data rate may vary from frame to frame. Instead of using binary logic for switching a fuzzy logic is performed.

In principle, the inventive method is suited for audio coding in MPEG2 LayerI to LayerIII and/or MPEG 2 NBC systems.

Advantageous additional embodiments of the inventive method result from the respective dependent claims.

Advantageous additional embodiments of the inventive apparatus result from the respective dependent claims.

DRAWINGS

Figure 3:
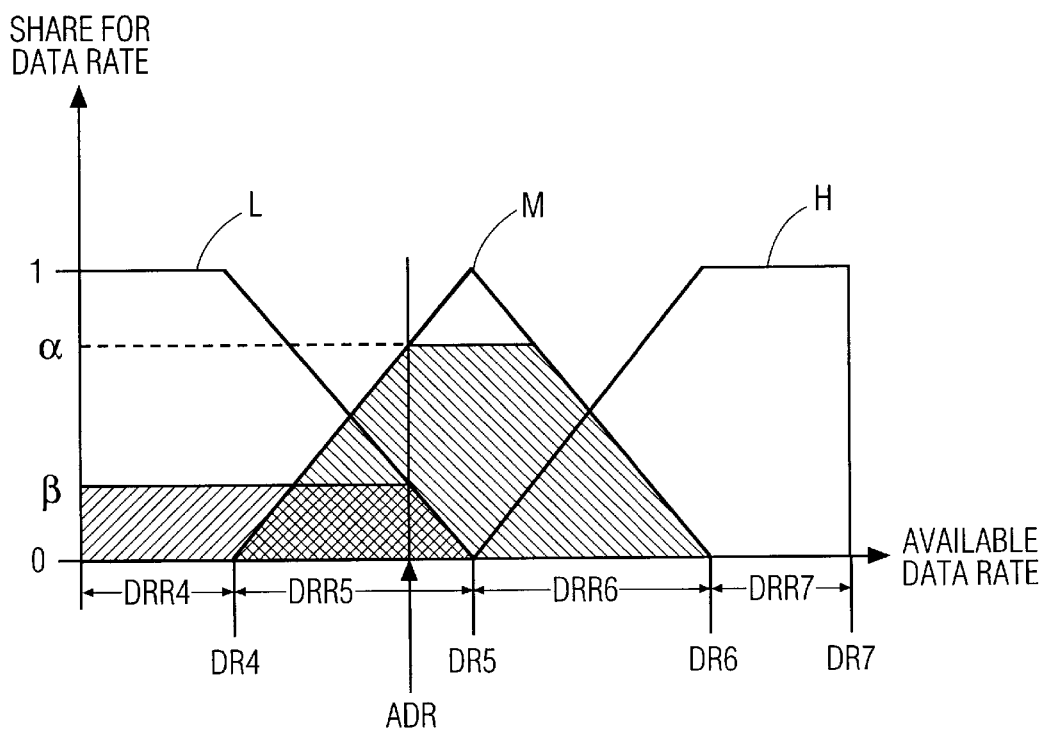
Figure 2:
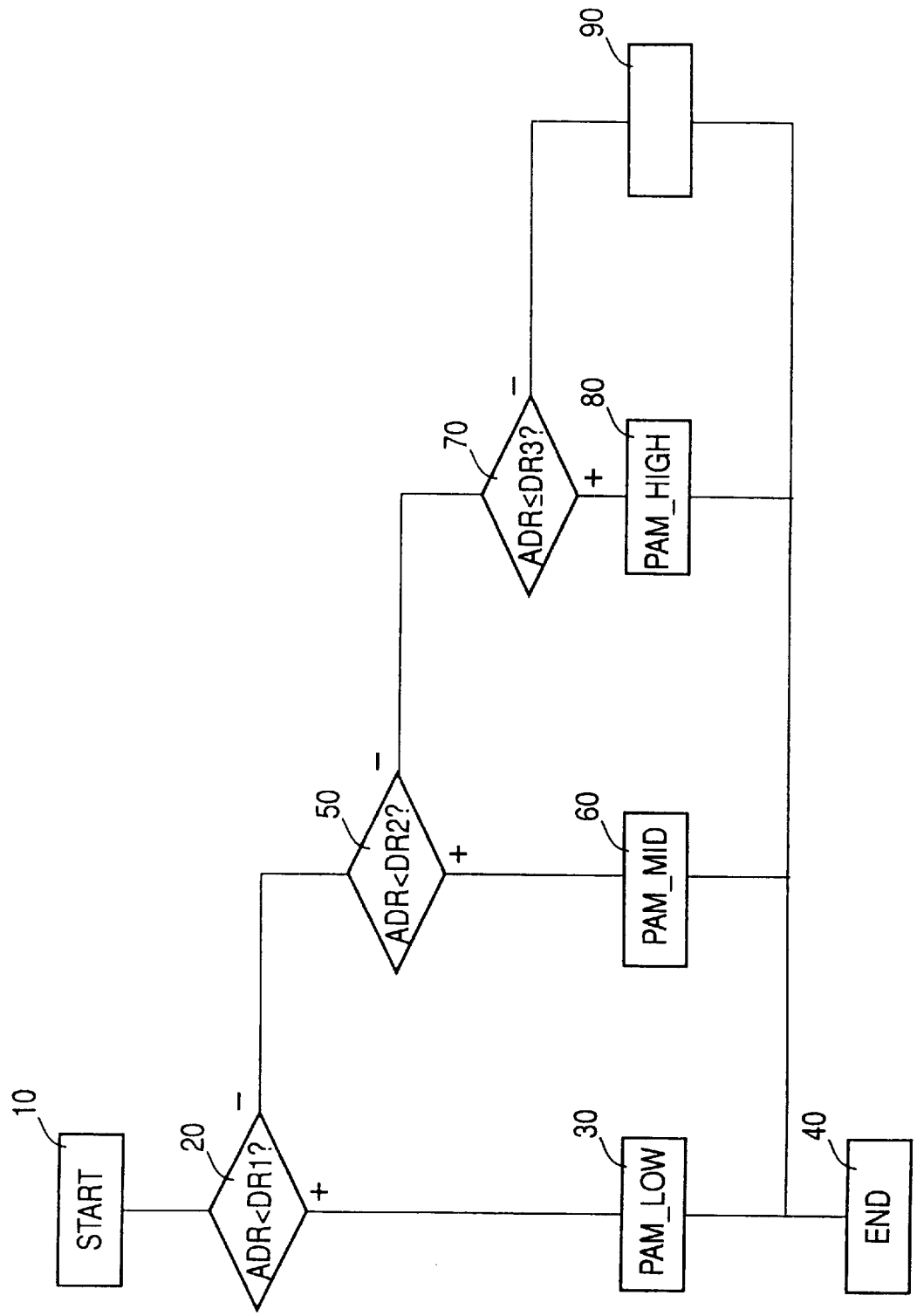
Figure 4:
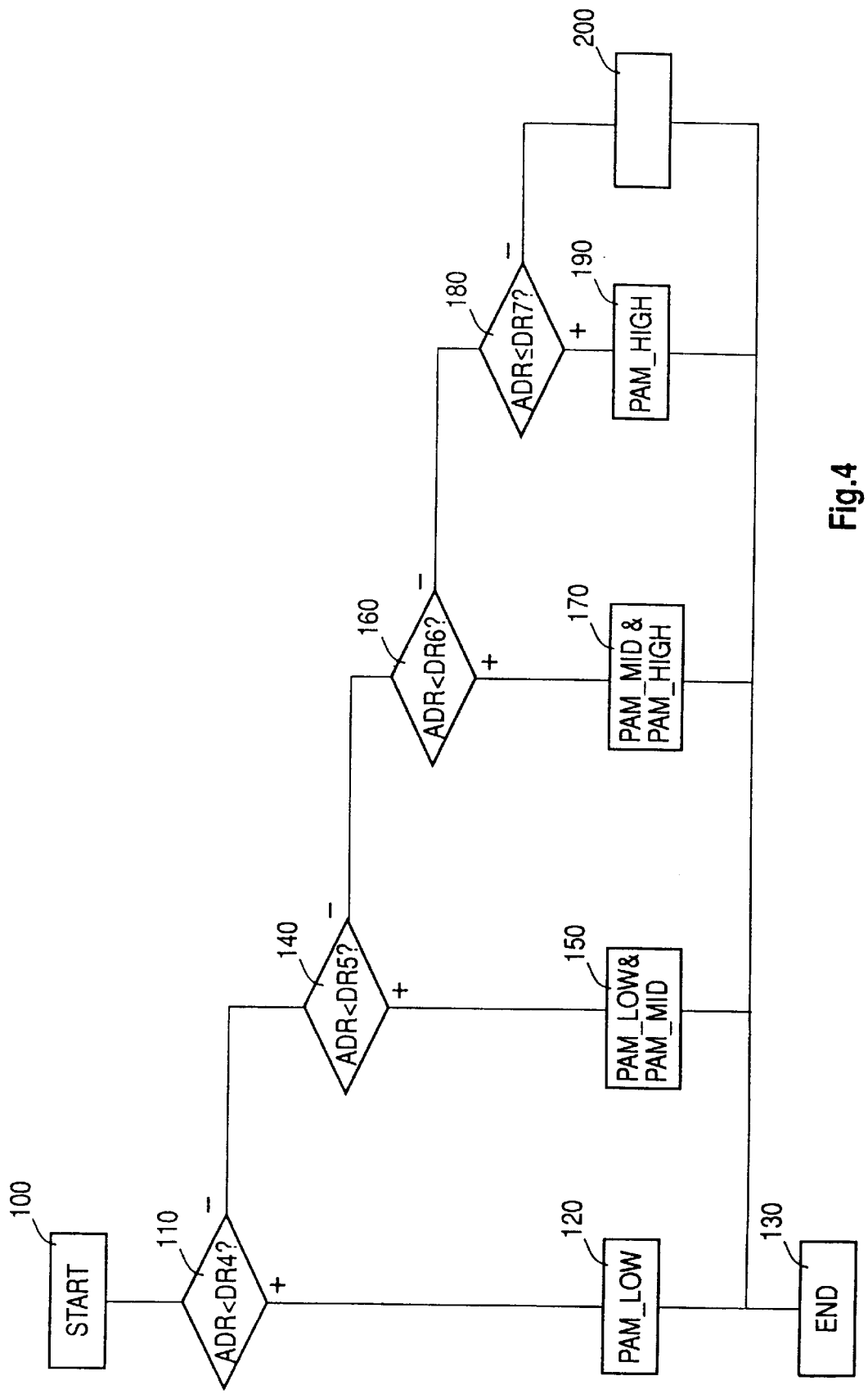
Figure 5:
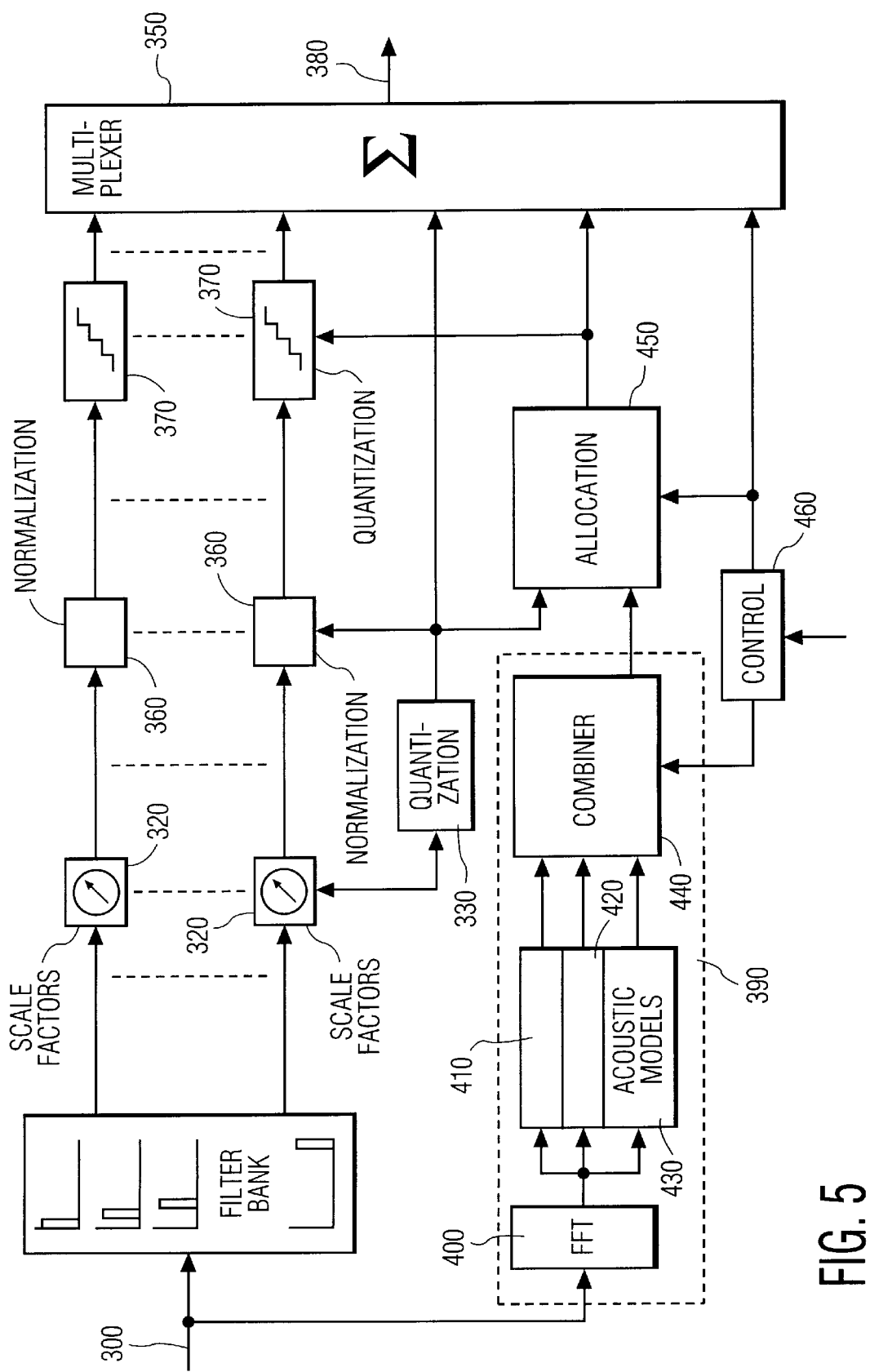

Preferred embodiments of the invention are described with reference to the accompanying drawings, which show in:

FIG. 1 a diagram showing a 'Hard Switching' method between three masking thresholds;

FIG. 2 a program structure for an audio encoding apparatus which uses the 'Hard Switching' method;

FIG. 3 a diagram showing the 'Soft Switching' method between three masking thresholds;

FIG. 4 a program structure for an audio encoding apparatus which uses the 'Soft Switching' method;

FIG. 5 a block diagram showing the principle constitution of an audio encoding apparatus;

PREFERRED EMBODIMENTS

Valuable information about audio encoding technique is included in the International Standard ISO/IEC 11172-3, First Edition 1993-08-01, 'Information technology—Coding of moving pictures and associated audio for digital storage media at up to about 1,5 MBit/s', Part 3 Audio.

The inventive method uses more than one psycho acoustic model. As an example three different psycho acoustic models are used. Each one of the psycho acoustic models is adapted to a specific predefined data rate of the audio bit stream. As an example there are the three different data rates 32 kBit/s, 56 kBit/s and 80 kBit/s. The different psycho acoustic models are abbreviated PSM_Low, PAM_Mid, PAM_High. PAM_Low is adapted to the low data rate of 32 kBit/s, PAM_Mid is adapted to the mid data rate of 56 kBit/s and PAM_High to the high data rate of 80 kBit/s.

Referring now to FIG. 1, it shows, in which areas which psycho acoustic model is used. On the X-axis in FIG. 1 the range of possible data rates which can be used by the audio encoder is stipulated. On the Y-axis the share of each psycho acoustic model is given for each possible data rate. When the available data rate is within range DRR1, the psycho acoustic model PAM_Low is used for the calculation of the masking threshold. So the sharing factor is 1, i.e. 100% for PAM_Low and 0% for PAM_Mid and PAM_High. When the available data rate is within range DRR2, the psycho acoustic model PAM_MID is used for the calculation of the masking threshold. So, here the sharing factor is 1, i.e. 100% for PAM_Mid and 0% for PAM_Low and PAM_High. When the available data rate is within range DRR3, the psycho acoustic model PAM_High is used for the calculation of the masking threshold. So, here the sharing factor is again 1, i.e. 100% for PAM_High and 0% for PAM_Low and PAM_Mid. This kind of switching between the different psycho acoustic models will be referred to as 'Hard Switching' from now on.

An appropriate simple computer program, which works according to this method is shown in FIG. 2 and will be described now.

Reference numeral 10 denotes the starting point of the program. Reference numeral 20 denotes a decision step, where it is determined, if the available data rate ADR is less than the data rate value DR1 shown in FIG. 1. If this is the case, the program proceeds with step 30. Therein the masking threshold is determined by usage of the psycho acoustic model PAM_Low. After this step the program will end in step 40. If in decision step 20 it is decided that the available data rate ADR is greater than data rate value DR1, it is analysed in decision step 50, whether the available data rate ADR is less than data rate value DR2 or not. In case of a positive decision the program proceeds with step 60 and the psycho acoustic model PAM_Mid is used for the calculation of the masking threshold. In case of a negative decision in step 50, the program proceeds to decision step 70. There it is analysed, whether the available data rate is less than or equal to the data rate value DR3. If this is the case, the program proceeds to step 80 where the psycho acoustic model PAM_High is used for the calculation of the masking threshold. In case of a negative answer in decision step 70, the program proceeds with step 90, which includes an appropriate error detection algorithm. After program steps 60, 80, 90 the program will be finished in step 40.

A refined method of switching between different psycho acoustic models called 'Soft Switching' will be explained hereinafter. In FIG. 3 there are three different ranges for the available data rate shown, named DRR4, DRR5 and DRR6. If the available data rate is within range DRR4, then the psycho acoustic model PAM_Low will be used only, i.e. with 100% share for the calculation of the masking threshold. If the available data rate is within range DRR7, then the psycho acoustic model PAM_High is used only. If the available data rate is within range DRR5, then both psycho acoustic models PAM_Low and PAM_Mid are used for the calculation of the corresponding masking threshold. In case the available data rate is within the range DRR6, the two psycho acoustic models PAM_Mid and PAM_High are used for the calculation of the masking threshold. As an example in FIG. 3 it is shown, that the available data rate ADR is within range DRR5. This means that two masking thresholds are calculated, namely a first one called Mask_Low corresponding to the PAM_Low model and a second one called Mask_Mid corresponding to the PAM_Mid model. Both masking thresholds are combined to a resulting masking threshold Mask. The new masking threshold is calculated with an average calculation according to the following formula:

Mask=α*Mask_Mid+β*Mask_Low

Formula 1: Example for average calculation.

Therein α is the sharing factor for the psycho acoustic model PAM_Mid and β the sharing factor for the psycho acoustic model PAM_Low. Both sharing factors are shown in FIG. 3. They are determined by looking up in tables which contain the values for representing the respective Curves L and M at the point of the available data rate ADR. With these technique it is possible to design an audio encoder which is capable of generating bit streams with a wide range of data rates.

An appropriate computer program which carries out the described method of soft switching will now be explained with respect to FIG. 4. Reference numeral 100 denotes the Start step of the computer program. In the next step 110 it is analysed whether the available data rate ADR is less than the data rate DR4 or not. A positive result leads to step 120 as the next program step. There, the masking threshold will be calculated only on the basis of the psycho acoustic model PAM_Low. After this step the program will be finished in step 130. In case of a negative result in step 110, the program proceeds with step 140. There it is determined, if the available data rate is less than data rate value DR5 or not. If this is the case, then in step 150 two masking thresholds are calculated. One on accord of psycho acoustic model PAM_Low and the other on accord of psycho acoustic model PAM_Mid. Both masking thresholds are then combined to a resulting masking threshold. For this purpose both masking thresholds are weighted with their corresponding weighting factors α and β as shown in FIG. 3. The combination operation makes use of the above mentioned formula 1 as described above. In case of a negative result in step 140, the next step is decision step 160. There it is determined, whether the available data rate is less than data rate value DR6. When this is true, the next step is step 170. There the two masking thresholds Mask_Mid and Mask_High are calculated based on the corresponding psycho acoustic models PAM_Mid and PAM_High. Also, they are weighted and combined as described for step 150. A negative result in decision step 160 leads to a decision step 180. Here it is analysed, whether the available data rate ADR is less than or equal to the data rate value DR7, shown in FIG. 3. After a positive decision program step 190 will be executed. There, the masking threshold is calculated based on psycho acoustic model PAM_High. A negative decision in step 180 leads to step 200 where an error detection algorithm is executed. After execution of one of the steps 150, 170, 190 and 200 the program is finished in step 130.

An apparatus for coding of audio signals which utilises the method of 'Soft Switching' will be described now with respect to FIG. 5.

This apparatus is based on the well known subband coding technique. The digitalized audio signal is fed via data bus 300 to filter bank 310. For ease it is assumed, that only one audio channel (Mono) is transmitted to the encoding apparatus. Of course the audio signal is fed in blocks to the coding apparatus. In filter bank 310 the audio signal is divided in 32 subbands. The subband samples are fed to blocks 320. Here, scale factors are calculated. They are used for data reduction purposes namely for suppressing leading '0'- and '1'-Bits of the subband samples. The scale factors of each subband block are fed to a scale factor quantization apparatus 330. There they are quantized, e.g. with 6 Bits resolution. The quantized scale factors are forwarded to a multiplexing device 350. Its function will be described later on. The subband samples are input in normalisation circuits 360 after they have passed block 320. Here the samples are multiplied by appropriate factors $1/U_s$, determined based on the quantized scale factors, which are input via busline 340. The normalised subband samples are fed to quantization circuits 370. Here, data reduction based on psycho acoustic effects is carried out. The bit resolution for quantization purposes is determined due to psycho acoustic models, which will be described hereinafter, so that quantization noise is not perceivable for the human ear. After passing the quantization circuits 370, the subband samples are forwarded to multiplexing device 350. Multiplexing device 350 creates the output bit stream of the encoding apparatus including all synchronisation and ancillary data. The bit stream is outputted via data bus 380.

The incoming bit stream via data bus 300 is fed to block 390. Therein, the frequency spectrum of the signal is calculated via a FFT-algorithm (Fast Fourier Transform) in block 400. Further on there are three different psycho acoustic models 410 to 430 available in block 390. The first one PAM_Low is adapted and optimised for a specific output bit stream of low bitrate, e.g. 32 kBit/s. The second one is adapted and optimised for an output bit stream of middle bitrate, e.g. 56 kBit/s. The third one is adapted and optimised for an output bit stream of high bitrate, e.g. 80kBit/s. Each one of the psycho acoustic models is capable of determining a masking threshold Mask_Low, Mask_Mid, Mask_High.

In MPEG1 and MPEG2-Standard, there is the possibility of predefining the bitrate within a wide range of bitrates (free format). Dependent on the predefined bitrate value, in the 'Hard Switching' mode one psycho acoustic model is used for the calculation of the masking threshold. This was already described with respect to FIG. 1 and 2. In 'Soft Switching' mode there may be used two different psycho acoustic models. This depends on the value of the predefined bitrate as described with respect to FIG. 3 and 4. The two masking thresholds are forwarded to combining device 440, where they are combined. The resulting data is fed to bit allocation unit 450. In 'Hard Switching' mode combining device 450 works as a selecting device for selecting the appropriate masking threshold data and forwarding it to bit allocation unit 450. The bit allocation unit calculates the bit allocation and controls the quantization circuits 370. Bit allocation data is forwarded to multiplexing device 350. Control circuit 460 predefines the available data rate, e.g. on accord of an input by a user and controls in dependence thereof combining device 440 and bit allocation unit 450. It also inputs ancillary data to multiplexing device 350.

The invention can be used in nearly all audio systems like MPEG, DAB, DCC, MD.

When instead of a psycho acoustic model a model for the eye physiology is applied, the invention can also be used for video coding like MPEG 1 or MPEG 2.

Multiple modifications of the described embodiments are possible. E.g. the shown curves L, M and H shown in FIG. 3 could be of different shape. Also the number of psycho acoustic models could be different to three. Some of the blocks shown in FIG. 5 could be realised by an appropriate computer program which is executed by a standard or specialised microprocessor. For combining the masking thresholds in 'Soft Switching' mode, a somewhat modified formula could be used instead of Formula 1. Also more than two masking thresholds could be combined.

I claim:

1. Method for data reduced encoding of a digitized audio signal, comprising the steps of:

subdividing an audio signal band into a number of sub-bands;

determining at least two masking thresholds for a time period of said audio signal based on at least two different psycho acoustic models;

combining said at least two masking thresholds to provide a resulting masking threshold; and utilizing said resultant masking threshold in a separate bit allocation process in which a bit resolution for quantization of the sub-band samples is determined by said resulting masking threshold in a sub-band.

2. Method according to claim 1, wherein the combination of the masking thresholds is a weighted combination and wherein the weighting factors are determined in dependence of the available data rate for the encoded bit stream.

3. Method according to claim 1, wherein the weighted combination is linear combination according to the following formula:

$$Mask = \alpha * Mask1 + \beta * Mask2$$

wherein Mask is the resulting masking threshold,

Mask1 is the masking threshold resulting from the first psycho acoustic model,

Mask2 is the masking threshold resulting from the second psycho acoustic model, $\alpha$ is the weighting factor for Mask1, and $\beta$ is the weighting factor for Mask2.

4. Method according to claim 1, wherein for each of the two or more psycho acoustic models an appropriate curve is provided, which has as an independent variable, the available data rate and as function values, values between "0" and "1" for determination of the weighting factors in dependence on the available data rate.

5. Apparatus for encoding a digitized audio signal comprising data reduction means for reducing the digital data of the audio signal due to a masking threshold being determined under consideration of psycho acoustic effects, comprising:

two or more psycho acoustic model means are provided for calculation of respective masking thresholds, each psycho acoustic model means being adapted to a specific data rate for the encoded bit stream, and combining means for combining the generated masking thresholds of the two or more psycho acoustic model means, thus leading to a resulting masking threshold which is used by the data reduction means.

6. Apparatus according to claim 5, wherein weighting means are provided for weighting the two or more masking thresholds before they are combined.

7. Apparatus according to claim 5, wherein the weighting means determine the weighting factors in dependence upon the available data rate for the encoded bit stream.

8. Method for data reduced encoding of a digitized audio signal comprising the steps of:

subdividing an audio signal band into a number of sub-bands;

determining at least two masking thresholds for a time period of said audio signal based on at least two different psycho acoustic models;

combining said at least two masking thresholds to produce a resulting masking threshold;

wherein a weighted combination is being made and weighting factors are determined, said weighting factors being dependent on an available data rate for an encoded bit-stream, utilizing said resulting masking threshold in a separate bit allocation process in which a bit resolution for quantization of the sub-band samples is determined by said resulting masking threshold in a sub-band.

9. The method according to claim 8, wherein the weighted combination is a linear combination according to the following formula:

$$Mask = \alpha * Mask1 + \beta * Mask2$$

wherein Mask is the resulting masking threshold,

Mask1 is the masking threshold resulting from the first psycho acoustic model,

Mask2 is the masking threshold resulting from the second psycho acoustic mode,

α is the weighting factor for Mask1, and

β is the weighting factor for Mask2.

10. The method according to claim 8, wherein for each of the two or more psycho acoustic models an appropriate curve is provided, which has as an independent variable, the available data, rate and as function values, values between "0" and "1" for determination of the weighting factors in dependence upon the available data rate.

11. An apparatus for encoding a digitized audio signal comprising:

a filter bank for dividing said audio signal in a number of sub-bands;

data reduction means for reducing digital data of said audio signal due to a masking threshold determined in response to psycho acoustic attributes;

at least two psycho acoustic model means being provided for calculation of respective masking thresholds, each psycho acoustic model means being adapted to a specific data rate for an encoded bit stream;

combining means for combining said calculated masking thresholds to provide a resulting masking threshold which is used by said data reduction means;

weighting means for weighting said at least two masking thresholds before they are combined, said weighting means determining weighting factors in response to an available data rate for said encoded bitstream; and a bit allocation unit which has as an input said resulting masking threshold for determining a bit resolution for quantization of sub-band samples according to said resulting masking threshold in a sub-band.

* * * * *